(12) United States Patent
Zhong et al.

(10) Patent No.: US 12,150,610 B2
(45) Date of Patent: Nov. 26, 2024

(54) CLEANING CONTROL METHOD FOR CLEANING ROBOT, BASE STATION AND STORAGE MEDIUM

(71) Applicant: SHENZHEN FLY RODENT DYNAMICS INTELLIGENT TECHNOLOGY CO., LTD., Shenzhen (CN)

(72) Inventors: Minghong Zhong, Shenzhen (CN); Hongwei Cheng, Shenzhen (CN)

(73) Assignee: SHENZHEN FLY RODENT DYNAMICS INTELLIGENT TECHNOLOGY CO., LTD., Shenzhen (CN)

(*) Notice: Subject to any disclaimer, the term of this patent is extended or adjusted under 35 U.S.C. 154(b) by 355 days.

(21) Appl. No.: 17/643,229

(22) Filed: Dec. 8, 2021

(65) Prior Publication Data
US 2022/0265111 A1    Aug. 25, 2022

(30) Foreign Application Priority Data
Feb. 25, 2021    (CN) .......................... 202110211291.9

(51) Int. Cl.
| A47L 11/28 | (2006.01) |
| A47L 11/40 | (2006.01) |
| B08B 3/02 | (2006.01) |
| B08B 13/00 | (2006.01) |
| G01N 21/59 | (2006.01) |

(52) U.S. Cl.
CPC .......... *A47L 11/4091* (2013.01); *A47L 11/28* (2013.01); *A47L 11/4011* (2013.01); *B08B 3/02* (2013.01); *B08B 13/00* (2013.01); *G01N 21/59* (2013.01); *A47L 2201/028* (2013.01)

(58) Field of Classification Search
CPC .. A47L 11/4091; A47L 11/28; A47L 11/4011; A47L 11/4036; A47L 2201/028; A47L 11/282; A47L 11/4005; A47L 11/4008; A47L 2201/00; A47L 2201/06; A47L 11/4016; B08B 1/007; B08B 3/08; B08B 13/00; B08B 3/02; G01N 21/59
See application file for complete search history.

(56) References Cited

U.S. PATENT DOCUMENTS

| 2020/0077858 A1* | 3/2020 | Zhang | ................. A47L 11/4061 |
| 2021/0038041 A1* | 2/2021 | Pruiett | ...................... A47L 9/19 |

FOREIGN PATENT DOCUMENTS

| CN | 102469908 A | 5/2012 |
| CN | 106618392 A | 5/2017 |
| CN | 108125632 A | 6/2018 |

(Continued)

OTHER PUBLICATIONS

Chinese Patent Office Official Action issued on Nov. 3, 2021 for corresponding CN Application No. 202110211291.9.

*Primary Examiner* — Erin F Bergner
(74) *Attorney, Agent, or Firm* — Samson G. Yu

(57) ABSTRACT

The cleaning control method for a cleaning robot includes: the base station performs a round of cleaning on a cleaning component of the cleaning robot according to a set cleaning strategy; the base station detects a dirtiness of the sewage after cleaning after completing a round of cleaning, to obtain a detection result; and the base station performs a next round of cleaning control on the cleaning robot according to the detection result.

14 Claims, 6 Drawing Sheets

(56) References Cited

FOREIGN PATENT DOCUMENTS

| | | | |
|---|---|---|---|
| CN | 108992013 A | 12/2018 | |
| CN | 109316136 A | 2/2019 | |
| CN | 109620064 A | 4/2019 | |
| CN | 110236455 A | 9/2019 | |
| CN | 110367885 A | 10/2019 | |
| CN | 110710937 A | 1/2020 | |
| CN | 111358342 A | 7/2020 | |
| CN | 111789538 A | 10/2020 | |
| CN | 112006618 A | 12/2020 | |
| CN | 112232532 A | 1/2021 | |
| CN | 112353271 A | 2/2021 | |
| WO | WO-2018107465 A1 * | 6/2018 | .............. A47L 11/24 |

* cited by examiner

CLEANING CONTROL METHOD FOR CLEANING ROBOT, BASE STATION AND STORAGE MEDIUM

CROSS-REFERENCE TO RELATED APPLICATIONS

This application is based upon and claims priority to Chinese Patent Application CN 202110211291.9, filed Feb. 25, 2021, the entire contents of which are incorporated herein by reference.

TECHNICAL FIELD

The present disclosure relates to smart home devices, and more particular to a cleaning control method for a cleaning robot, a base station and a storage medium.

BACKGROUND

The traditional cleaning robots and their matching base stations usually treat sewage by dirty separation or water circulation. While cleaning the robots, the base stations clean the dirt and garbage on the mopping cloth of the cleaning robot by scraping, rotation, vibration or the like.

However, some sewage and some solid waste are produced after the base station completes cleaning the cleaning robot. The cleaning component is usually cleaned by using the same amount of time and the same amount of water each time. However, the dirtiness of the floor to be cleaned by the cleaning component is uncertain. Sometimes the cleaning component is dirty, and sometimes it is not particularly dirty, but the same amount of water and the same amount of cleaning time are used to clean each time, resulting in the cleaning component incompletely cleaned or over-cleaned which wastes water.

SUMMARY

There are provided a cleaning control method for a cleaning robot, a base station and a storage medium according to embodiments of the present disclosure. The technical solution is as below:

According to a first aspect of embodiments of the present disclosure, there is provided a cleaning control method for a cleaning robot, comprising:
    performing, by a base station, a round of cleaning on a cleaning component of the cleaning robot according to a set cleaning strategy;
    detecting, by the base station, a dirtiness of sewage after cleaning to obtain a detection result, after completing the round of cleaning; and
    performing, by the base station, a next round of cleaning control on the cleaning robot according to the detection result.

According to a second aspect of embodiments of the present disclosure, there is provided a base station, applied to a cleaning robot, comprising a memory and at least one processor, wherein instructions are stored in the memory, and
    wherein the at least one processor calls the instructions in the memory, so that the base station executes a cleaning control method for the cleaning robot, comprising:
    performing, by a base station, a round of cleaning on a cleaning component of the cleaning robot according to a set cleaning strategy;
    detecting, by the base station, a dirtiness of sewage after cleaning to obtain a detection result, after completing the round of cleaning; and
    performing, by the base station, a next round of cleaning control on the cleaning robot according to the detection result.

According to a third aspect of embodiments of the present disclosure, there is provided a non-transitory computer-readable storage medium, storing instructions, wherein when the instructions are run on a computer, the computer executes a cleaning control method for a cleaning robot, comprising:
    performing, by a base station, a round of cleaning on a cleaning component of the cleaning robot according to a set cleaning strategy;
    detecting, by the base station, a dirtiness of sewage after cleaning to obtain a detection result, after completing the round of cleaning; and
    performing, by the base station, a next round of cleaning control on the cleaning robot according to the detection result.

DETAILED DESCRIPTION

The embodiments of the present disclosure provide a cleaning control method, a device, equipment and a storage medium for a cleaning robot, which are configured to control cleaning conditions of the cleaning robot. The terms "first", "second", "third", "fourth", and the like (if any) in the description, claims of the present disclosure and the above-mentioned drawings are used to distinguish similar objects without having to be used to describe a particular order or sequence. It should be understood that the data used in this way may be interchanged under appropriate circumstances, so that the embodiments described herein may be implemented in a sequence other than the content illustrated or described herein. In addition, the terms "including" or "having" and any variations thereof are intended to cover non-exclusive inclusion. For example, a series of steps or units included in a process, a method, a system, a product or a device are not necessarily limited to those clearly listed. Instead, those steps or units may include other steps or units that are not clearly listed or are inherent to the process, the method, the product, or the device.

Figure 1:
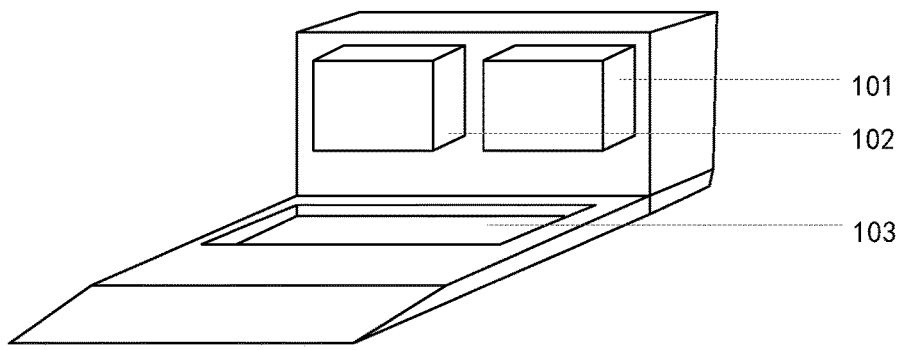
FIG. 1 is a schematic structural view of a base station according to a first embodiment of the present disclosure.

For ease of understanding, before describing the embodiments of the present disclosure, the structure of the base station used in the solution of the present disclosure will be described. Referring to FIG. 1, the base station is described as follows, which it is not limited to the base station shown in FIG. 1.

The base station of the present disclosure includes a cleaning water tank 101, a sewage tank 102, and a sewage temporary storage tank 103. The cleaning water tank 101 is configured to store cleaning water of the cleaning robot. The sewage temporary storage tank 103 is configured to temporarily store sewage after cleaning the robot. The base station detects the dirtiness of the sewage in the sewage temporary storage tank. The sewage tank 102 is connected to the sewage temporary storage tank 103, so that the sewage in the sewage temporary storage tank 103 is sucked into the sewage tank 102 for storage after the base station completes the detection of the dirtiness of the sewage.

Figure 2:
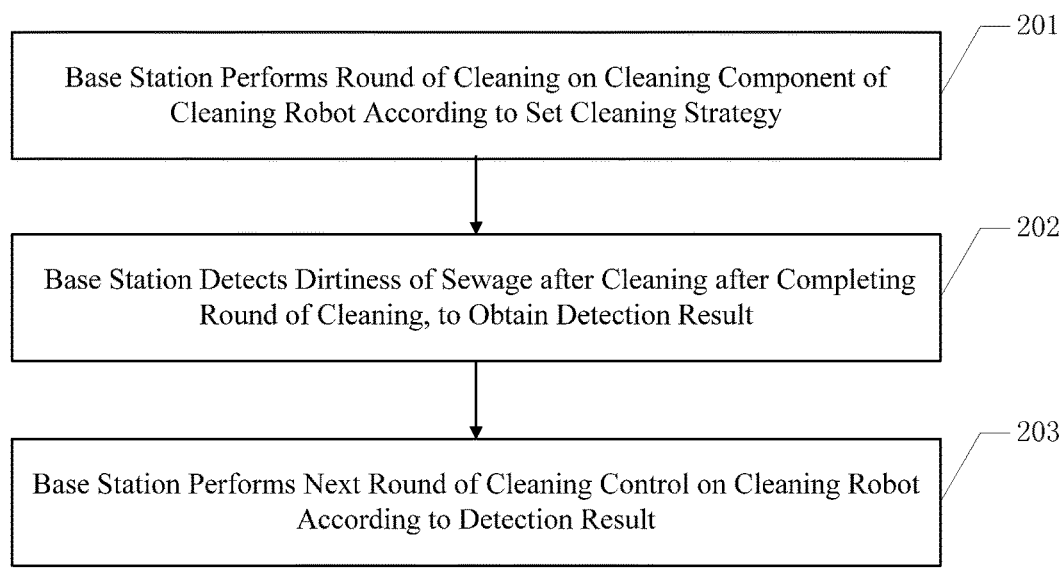
FIG. 2 is a flow chart of a cleaning control method for a cleaning robot according to the first embodiment of the present disclosure.

A specific process of the embodiment of the present disclosure is described as follows. Referring to FIG. 2, the cleaning control method for the cleaning robot in the first embodiment of the present disclosure includes the following steps.

201. The base station performs a round of cleaning on the cleaning component of the cleaning robot according to a set cleaning strategy.

In this embodiment, specific types and specific application scenarios of the cleaning robot are not limited herein, which may include household mopping robots and washing robots used in shopping malls.

In the first case of this embodiment, the cleaning robot can move to the base station by itself after completing the cleaning operation. In this circumstance, the base station may perform a round of cleaning on the cleaning component of the cleaning robot according to the preset cleaning strategy. In the second case, the base station completes the previous round of cleaning on the cleaning robot, and performs another round of cleaning on the cleaning component of the cleaning robot according to the cleaning strategy reset according to the result of the previous round of cleaning.

In this embodiment, the base station includes a cleaning device, which may be controlled by a set cleaning strategy, and performs a round of cleaning on the cleaning component of the cleaning robot according to the conditions set by the cleaning strategy.

In this embodiment, the set cleaning strategy may include at least one of the number of cleanings, the water spraying amount of each cleaning, cleaning time of each cleaning, and the cleaning method. In addition, it may further include exiting cleaning, which is not limited herein. The cleaning device in the cleaning cavity of the base station may clean the cleaning component by scraping, rotating, vibrating, ultrasonic, cooperating with the cleaning robot, or other cleaning methods, which is not limited herein.

202. The base station detects dirtiness of sewage after completing the round of cleaning, to obtain a detection result.

In this embodiment, after the base station completes a round of cleaning on the cleaning robot, the dirt on the cleaning robot is washed down to form sewage. Therefore, the dirtier the cleaning component is, naturally the higher the dirtiness of the sewage after cleaning is. The cleaner the cleaning component is, the lower the dirtiness of the sewage after cleaning is. Therefore, the base station may indirectly determine the dirtiness of the cleaning component by detecting the dirtiness of the sewage, thereby determining the next round of cleaning control solution. In this embodiment, the dirtiness of the sewage may be detected by optical detection methods, for example, including a light transmission detection method and an absorbance detection method, in which the light source used may be an ultraviolet light or an infrared absorption light.

Specifically, for the light transmittance detection method, the dirtiness of the sewage may be detected by the transmittance. For the light absorbance detection method, the dirtiness of the sewage may be detected by the absorbance. Both may be used as the dirtiness detection result of the sewage, that is, the dirtiness measurement value, which is not limited herein. When the dirtiness of the sewage is higher, it can be known that the light transmittance of the sewage is lower and the absorbance rate is higher.

In this embodiment, in order to facilitate the base station to detect the dirtiness of the sewage, the sewage temporary storage tank is added in the base station to collect the sewage after cleaning. A dirtiness detection device such as an optical component may be arranged in the sewage temporary storage tank to detect the dirtiness of the sewage.

In this embodiment, after completing a round of dirtiness detection of the sewage, the sewage in the sewage temporary storage tank is pumped to the sewage tank of the base station by the water pump of the base station, in order to avoid affecting the next round of dirtiness detection of the sewage. In this embodiment, for the dirtiness detection of the sewage, only the sewage in the sewage temporary storage tank is detected, not the sewage in the sewage tank.

203. The base station performs a next round of cleaning control on the cleaning robot according to the detection result.

In this embodiment, the detection result of the sewage is obtained to determine the dirtiness of the sewage, so as to measure the dirtiness of the cleaning component. Therefore, on the one hand, whether the cleaning component meets a cleaning standard may be measured according to the dirtiness of the cleaning component. That is, whether the cleaning component has been cleaned determines whether the cleaning robot needs to be cleaned for the next round. On the other hand, if the cleaning robot needs to be cleaned for the next round, the dirtiness of the cleaning component may be determined according to the detection result, thereby flexibly setting the next round of cleaning strategy for the next round of cleaning. When it is determined that the cleaning robot does not need to perform the next round of cleaning according to the detection result, the base station exits the cleaning control, otherwise the base station cleans the cleaning robot according to the next round of cleaning strategy.

Optionally, if the cleaning robot needs to be cleaned for the next round, the cleaning robot may also be cleaned directly for the next round without changing the cleaning strategy. After each cleaning, one is added to the record of number of cleanings, thereby controlling the number of cleanings of the cleaning robot.

In this embodiment, for determining whether the cleaning robot needs to be cleaned for the next round, the cleaning exit condition can be preset. The cleaning exit condition may be determined by judging whether the detection result meets the cleaning exit condition, so as to determine whether the cleaning robot needs to perform the next round of cleaning control. As for how to flexibly set the next round of cleaning strategy according to the detection result, it may also be set by setting methods of the preset cleaning strategy, which may include a setting method of the cleaning time, a setting method of the spray amount, a setting method of the number of cleanings, and a setting method of the cleaning method.

In the embodiment of the present disclosure, the base station firstly performs a round of cleaning on the cleaning component of the cleaning robot according to the set cleaning strategy, and then collects the sewage, and detects the dirtiness of the sewage to characterize the dirtiness of the cleaning component, and finally controls the cleaning component of the cleaning robot perform cleaning according to the dirtiness of the sewage, so as to realize that the cleaning control conditions are determined according to the dirtiness of the cleaning component, thereby improving the flexibility of the cleaning control of the cleaning robot.

Figure 3:
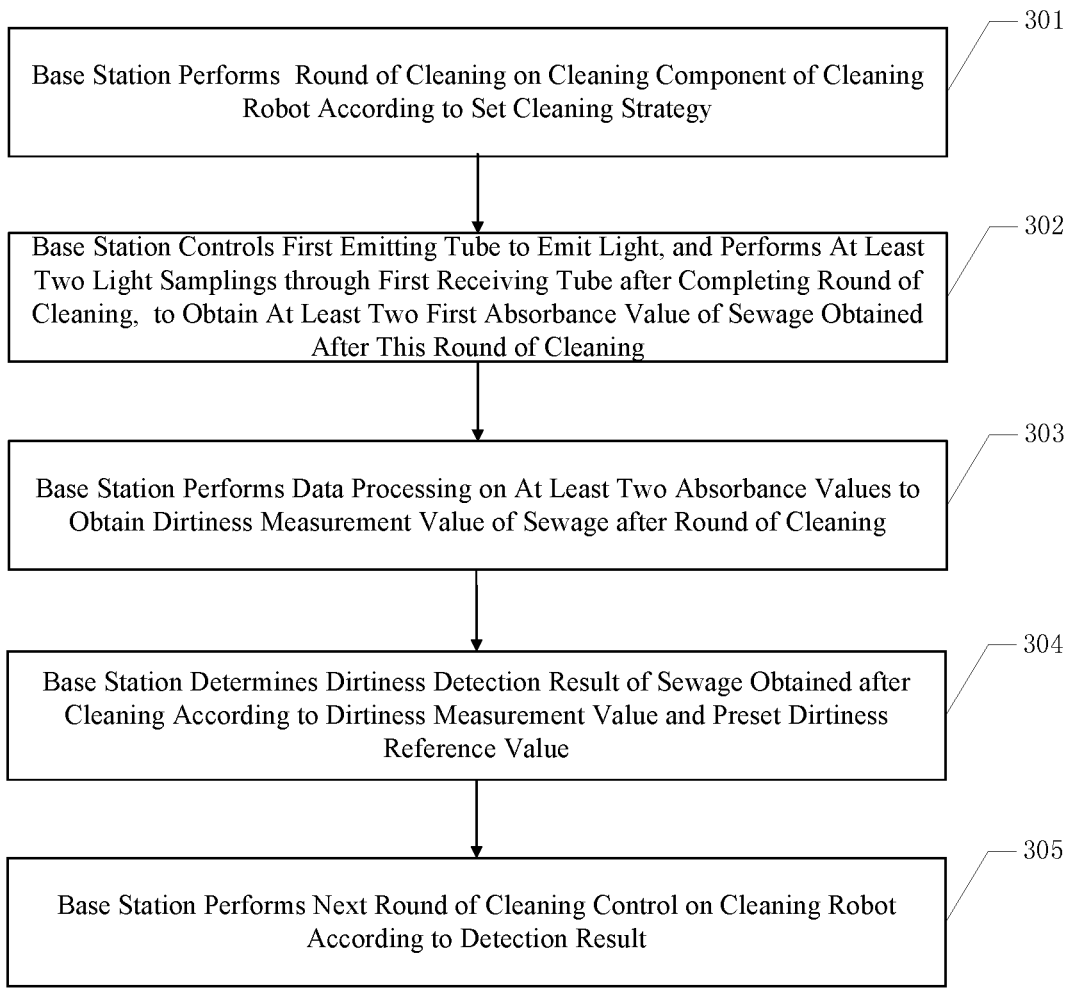
FIG. 3 is a flow chart of the cleaning control method for the cleaning robot according to a second embodiment of the present disclosure.

Referring to FIG. 3, the cleaning control method for the cleaning robot according to the second embodiment of the present disclosure includes the following steps.

301. The base station performs a round of cleaning on a cleaning component of the cleaning robot according to a set cleaning strategy.

302. The base station controls a first emitting tube to emit light after completing the round of cleaning, and performs at least two light samplings through a first receiving tube to obtain at least two first absorbance values of the sewage after the round of cleaning.

Figure 4:
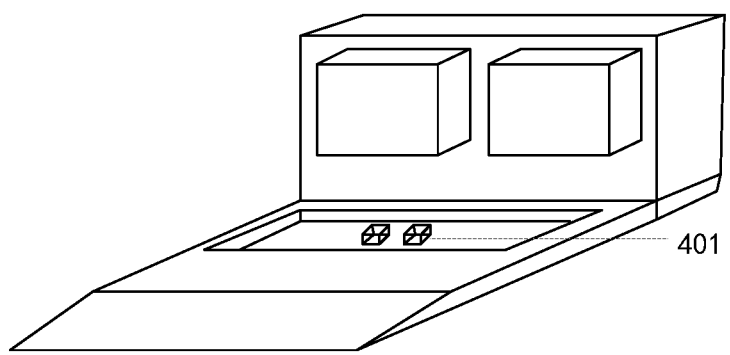
FIG. 4 is a schematic structural view of the base station according to a second embodiment of the present disclosure.
Figure 5:
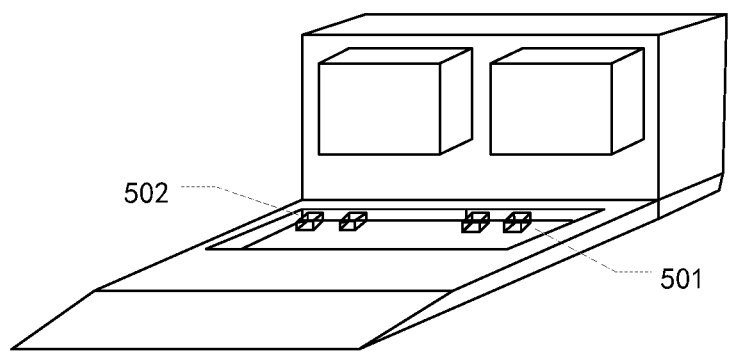
FIG. 5 is a schematic structural view of the base station according to a third embodiment of the present disclosure.
Figure 6:
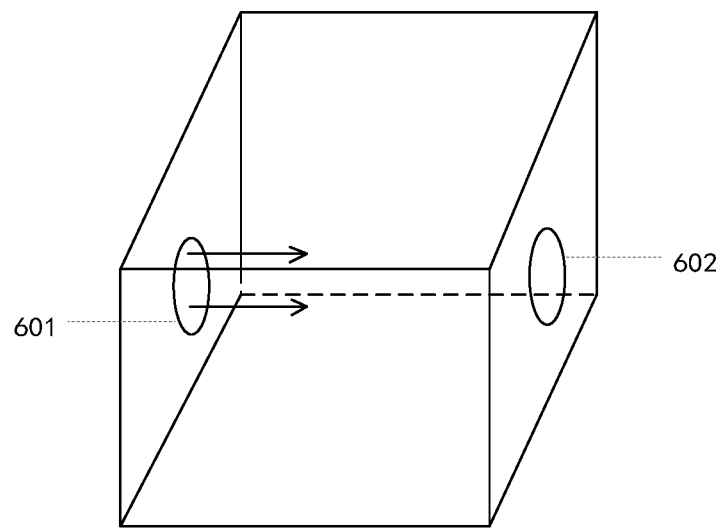
FIG. 6 is a schematic diagram of an arrangement of optical components in the base station according to an embodiment of the present disclosure.

In this embodiment, a plurality of first optical components are further arranged in the sewage temporary storage tank of the base station. A set of the first optical components include a first emitting tube and a first receiving tube that are arranged opposite to each other. The number, placement direction and placement position of the first optical components are not specifically limited herein, which may be arranged by the user according to the practical situation. As shown in FIG. 4, a set of first optical components 401 may be placed in the middle of the sewage temporary storage tank. As shown in FIG. 5, a set of first optical components 501 and another set of first optical components 502 may also be placed on each of both sides of the sewage temporary storage tank. The mounting methods of the first optical components shown in FIGS. 4 and 5 are only for demonstration, and there is no restriction on the mounting methods of the first optical components in the sewage temporary storage tank. FIG. 6 is a schematic diagram of the optical component, which includes a first emitting tube 601 and a first receiving tube 602 that are arranged opposite to each other, and a sewage area provided therebetween.

Optionally, the first light-emitting tube may be an ultraviolet LED of a wavelength of 410 nm and a power of 3 W, and the first receiving tube may be a conventional photocell, such as a photocell with a model of 2DU10.

In this embodiment, there may be solid waste precipitation due to the solid waste contained in the sewage, which greatly increases the cleanliness detection of the sewage. Therefore, in order to prevent the precipitated solid waste from affecting the cleanliness detection of the sewage, the first emitting tube and the first receiving tube may be arranged at a position above the bottom, such as 3 mm, 4 mm, 5 mm above the bottom, which is not specifically limited herein.

In this embodiment, for each set of the first light emitting components, the base station performs at least two sampling through the first receiving tube to improve the accuracy of the first absorbance value of the sewage. In addition, the first absorbance values collected by each set of the first light emitting components are independent and stored in different data sets.

Further, the optical sampling time and the optical sampling frequency may be set by the user according to the practical situation, which is not specifically limited herein. Optionally, the optical sampling time is not less than 3 seconds.

Further, the first absorbance values collected by each set of the first receiving tubes may also be filtered to reduce detection errors caused by uneven distribution of dirt in the sewage temporary storage tank.

303. The base station performs a data processing on the at least two first absorbance values to obtain a dirtiness measurement value of the sewage after the round of cleaning.

The dirtiness measurement value in this embodiment is configured to detect the dirtiness of the sewage after cleaning the cleaning robot in this round. The dirtiness measurement value performs a data processing on the first absorbance value. The data processing may include one or more processings, to obtain one or more different measurement values. For example, the absorbance, transmittance, and variance of the sewage may be calculated by the first absorbance value.

The first absorbance value in this embodiment includes a plurality of data sets collected by different first optical components in multiple samplings. The first absorbance value may be processed in the following manner. A preliminary processing is performed on different data sets in the first absorbance values, and then the results of different data sets are intensively processed.

Further, the dirtiness measurement value of the sewage may be specifically calculated by the following method. The base station determines a mean value and/or a variance of the at least two first absorbance values to obtain the dirtiness measurement value of the sewage after the round of cleaning. The dirtiness measurement value includes an absorbance mean value and/or an absorbance variance.

In this embodiment, for the absorbance mean value in the dirtiness measurement value, the mean value of the data set in a single sample in a single set of the first optical components is firstly calculated, and then the mean value of each sample of the single set of the first optical components is calculated again, and finally the mean value of the mean value of each set of the first optical components is calculated again, thereby obtaining the mean value of the absorbance of the sewage. For the absorbance variance, it is calculated by the mean value of each sample of each set of the first optical components, or it is calculated by the mean value of each set of the first optical components. That is, the dirtiness measurement value includes the absorbance mean value and/or the absorbance variance of the sewage.

In this embodiment, the dirtiness of the sewage is measured by the mean value of absorbance and/or the variance of absorbance. When the dirtiness of the sewage is high, the dirt in the sewage is more, and the light absorbance is higher. When the dirtiness of the sewage is low, the dirt in the sewage is less, and the light absorbance is lower. Therefore, the dirtiness of the sewage is measured in this way. In addition, the absorbance variance is introduced to measure a dispersion degree of the first absorbance values obtained by sampling each set of the first optical components, so as to determine whether the dirtiness of the sewage is evenly distributed. If the absorbance variance exceeds the threshold, the dirtiness of the sewage in the sewage area corresponding to the optical component is high or low, and then the absorbance variance may be discarded.

304. The base station determines a dirtiness detection result of the sewage after cleaning according to the dirtiness measurement value and a preset dirtiness reference value.

In this embodiment, the dirtiness of the sewage may be measured after the dirtiness measurement value is obtained, and then the dirtiness reference value is introduced. The dirtiness reference value is configured to determine whether the dirtiness of the sewage reaches the cleaning effect on the one hand, thereby determining whether the sewage needs to be cleaned. If the sewage needs to be cleaned in the next round, the dirtiness reference value may be further configured to measure the dirtiness of the sewage on the other hand, and then a corresponding cleaning strategy is formulated to clean the cleaning component. The preset dirtiness reference value may be calculated based on experimental experience, industry rules or on-site calculations, which may be set according to practical needs.

In this embodiment, the measurement type and the measurement value included in the dirtiness reference value are at least consistent with the measurement type and the measurement value included in the dirtiness measurement value. When the dirtiness measurement value includes the absorbance mean value and/or the absorbance variance, the dirtiness reference value at least includes the absorbance reference mean value and/or the absorbance reference variance correspondingly. In this case, the dirtiness detection result may be represented by the difference between the dirtiness measurement value and the dirtiness reference value.

Further, the calculation method of the dirtiness detection result is as follows.

(1) The base station calculates the difference between the absorbance mean value and the absorbance reference mean value to obtain the mean value difference between the two.

(2) And/or, the base station performs a numerical comparison between the absorbance variance and the absorbance reference variance to obtain a numerical comparison result of the two.

(3) The base station determines the dirtiness detection result of the sewage after the round of cleaning according to the mean value difference and/or the numerical comparison result.

In this embodiment, the comparison result between the absorbance variance and the absorbance reference variance may be a difference between the two.

Further, since the different cleaning water in the cleaning water tank varies in dirtiness, in order to prevent that from affecting the dirtiness detection result of the sewage after cleaning the robot, the dirtiness of the cleaning water in the cleaning water tank may need to be detected, and the detection result may be set to the dirtiness reference value as follows.

(1) The base station controls the second emitting tube to emit light and performs a light sampling through the second receiving tube to obtain the second absorbance value of the cleaning water in the cleaning water tank.

(2) The base station performs a data processing on the second absorbance value to obtain a dirtiness measurement value of the cleaning water in the cleaning water tank;

(3) The base station sets the dirtiness measurement value of the cleaning water in the cleaning water tank as the dirtiness reference value.

Figure 7:
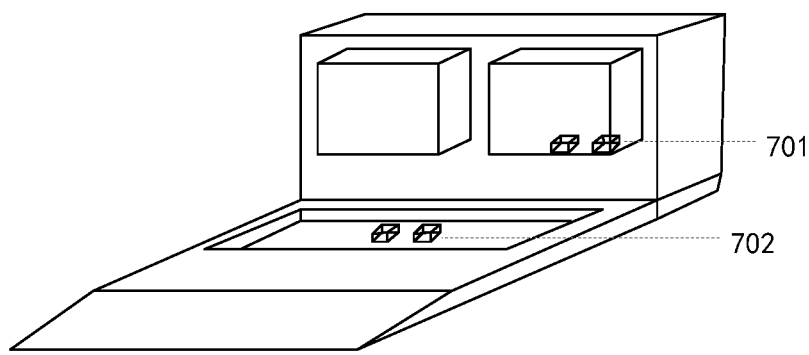
FIG. 7 is a schematic structural view of the base station according to a fourth embodiment of the present disclosure.

In this embodiment, the process of the data processing of the second absorbance value is the same as the process of the data processing of the first absorbance value, which will not be repeated herein. For example, as shown in FIG. 7, the cleaning water tank of the base station is provided with a plurality of second optical components 701, which have the same structure type as the first optical components 702 mounted in the sewage tank. A set of the second optical components include a second emitting tube and a second receiving tube that are arranged opposite to each other. The mounting method and the number of the second optical components are not limited herein. FIG. 7 is only for demonstration and does not limit the mounting of the second component.

Optionally, the second optical components may be mounted at the bottom of the cleaning water tank, the water outlet, or a position adjacent to the water outlet.

Specifically, in some scenarios, for example, the user uses wastewater, such as vegetable washing water or rice washing water for floor cleaning, so that the cleaning water in the cleaning water tank is the above-mentioned wastewater, which has a high dirtiness than the ordinary cleaning water. Compared to using ordinary cleaning water for cleaning, the obtained sewage has a higher dirtiness after completing a round of cleaning on the cleaning robot. In this case, it is obviously inappropriate to use the same dirtiness reference value as that of clean water, which will affect the detection results. Therefore, it is obviously more appropriate to detect the dirtiness of the waste water in the cleaning water tank by using the method of this embodiment, and set it as the dirtiness reference value. In addition, when the conventional water in different cities is adopted as the cleaning water, the cleanness of the cleaning water may also be different, which affects the dirtiness detection result of the sewage.

305. The base station performs the next round of cleaning control on the cleaning robot according to the detection result.

In the embodiment of the present disclosure, it is described in detail how the base station detects the dirtiness of the sewage, and obtains the corresponding dirtiness measurement value. Specifically, the detection of the absorbance of the sewage may be performed by the first optical components mounted in the sewage tank of the base station, and the dirtiness of the cleaning robot is detected indirectly through the absorbance mean value and the absorbance variance. An actual dirtiness of the cleaning robot is further determined by using the dirtiness reference value as a standard. Specifically, the second optical components may be mounted in the cleaning water tank of the base station, to detect the absorbance mean value and the absorbance variance of the cleaning water. Finally, the dirtiness difference between the sewage and the cleaning water is determined by the difference between the dirtiness measurement value and the dirtiness reference value, so as to provides a reference for formulating the next round of cleaning strategy, and realize the dirtiness detection of the cleaning robot for subsequent cleaning control of the cleaning robot, which is conductive to improve the flexibility of the cleaning control of the cleaning robot.

Figure 8:
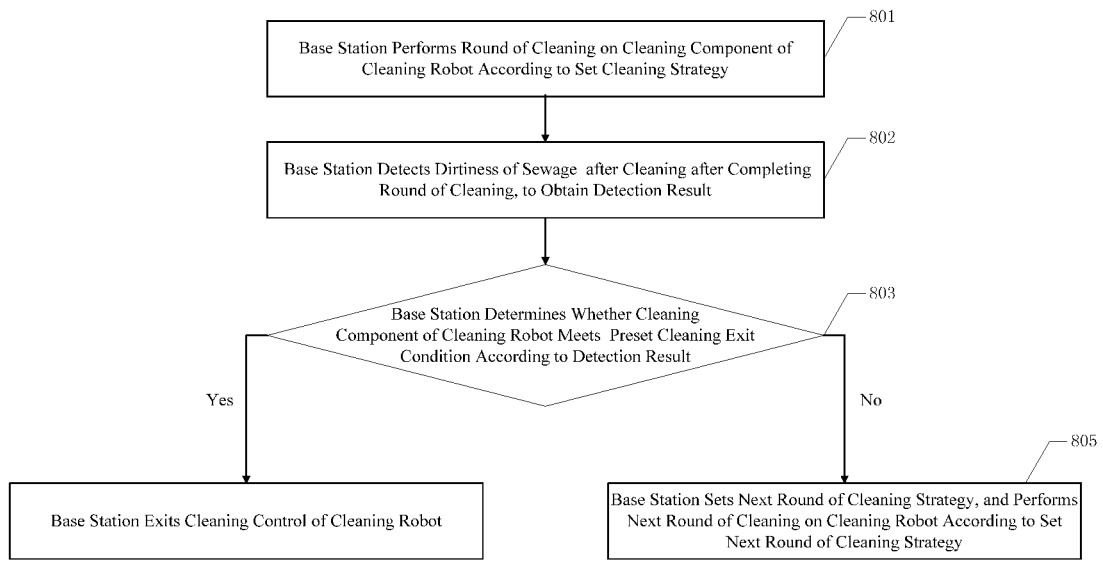
FIG. 8 is a flow chart of the cleaning control method for the cleaning robot according to a third embodiment of the present disclosure.

Referring to FIG. 8, the cleaning control method for the cleaning robot according to the third embodiment of the present disclosure includes the following steps.

801. The base station performs a round of cleaning on a cleaning component of the cleaning robot according to a set cleaning strategy.

802. The base station detects the dirtiness of the sewage after cleaning after completing the round of cleaning, to obtain a detection result.

803. The base station determines whether the cleaning component of the cleaning robot meets a preset cleaning exit condition according to the detection result.

In this embodiment, the detection result of the sewage is measured by the preset cleaning exit condition, so as to determine whether the cleaning robot has achieved the cleaning effect. If the detection result meets the cleaning exit condition, it is indicated that the cleaning robot has reached the cleaning effect. If the detection result does not meet the cleaning exit condition, it is indicated that the cleaning robot has not achieved the cleaning effect.

Specifically, if the dirtiness measurement value is adopted as the dirtiness detection result of the sewage, a dirtiness measurement threshold may be set correspondingly. When the dirtiness measurement value is less than or greater than the dirtiness measurement threshold, it is indicated that the cleaning robot has achieved the cleaning effect or the cleaning robot has not achieved the cleaning effect.

Specifically, if the dirtiness measurement value includes the absorbance mean value and/or the absorbance variance, an absorbance threshold and/or an absorbance variance threshold may be set correspondingly. Accordingly, if the absorbance mean value is higher, the dirtiness of the sewage is higher. Otherwise, if the absorbance mean value is lower, the dirtiness of the sewage is lower. Therefore, it may be determined that the cleaning robot has achieved the cleaning effect when the absorbance mean value is lower than the threshold of the absorbance mean value.

804. If the detection result meets the cleaning exit condition, the base station exits cleaning control of the cleaning robot.

In this embodiment, when it is determined that the cleaning component has met the cleaning exit condition according to the detection result, there is no need to perform the next round of cleaning on the cleaning component, and the base station may directly exit the cleaning control of the cleaning robot.

805. If the detection result does not meet the cleaning exit condition, the base station sets a next round of cleaning strategy, and performs the next round of cleaning on the cleaning robot according to the set next round of cleaning strategy.

In this embodiment, when it is determined that the cleaning component does not meet the cleaning exit condition according to the detection result, the cleaning component needs to be cleaned for the next round. In this circumstance, the next round of cleaning strategy needs to be flexibly customized according to the detection result, so as to perform the next round of cleaning on the robot. That is, when it is showed from the detection result that the cleaning robot has a high dirtiness, the cleaning robot is cleaned by a higher-intensity cleaning strategy. When it is showed from the detection result that the cleaning robot has a low dirtiness, the cleaning robot only need to be cleaned by a lower-intensity cleaning strategy. The higher-intensity cleaning strategies include increasing the cleaning time, the number of cleanings, and the water spraying amount, or using more powerful cleaning methods, while the lower cleaning strategies may include reducing the cleaning time, the number of cleanings, and the water spraying amount, or using mild cleaning methods.

Further, the process of setting a cleaning strategy may include the following steps. The base station sets a next round of cleaning strategy according to the dirtiness measurement value and the dirtiness reference value. The cleaning strategy includes cleaning time and/or water spraying amount.

In this embodiment, the cleaning time and/or water spraying amount may be adopted as the cleaning strategy, the dirtiness of the cleaning robot is determined according to the scale of the dirtiness measurement value, thereby setting the corresponding cleaning time and/or water spraying amount. When the dirtiness measurement value is larger, the dirtiness of the cleaning robot is higher, so it is necessary to set a longer cleaning time and/or a larger water spraying amount. Otherwise, a shorter cleaning time and/or a smaller water spraying amount should be set. The method of controlling the cleaning time and the water spraying amount based on the dirtiness of the sewage has the following advantages. Firstly, the cleaning efficiency of the cleaning robot can be improved. Secondly, the cleaning effect on the cleaning component of the cleaning robot can be achieved. Thirdly, the waste of cleaning water can be reduced on the premise that the cleaning component of the cleaning robot has achieved the cleaning effect.

Specifically, in one case, when the cleaning robot cleans the indoor floor, the cleaning component of the cleaning robot may be dirty after cleaning the areas with dirty floors such as halls, so that the dirtiness of the sewage is still high after cleaning the cleaning component, and it is detected that the difference between the dirtiness measurement value and the dirtiness reference value is large. Therefore, a longer cleaning time and/or a larger water spraying amount is automatically set while setting the next round of cleaning strategies, in order to clean the cleaning robot with greater intensity. And the cleaning component of the cleaning robot may be clean after cleaning the areas with clean floors such as rooms, and the cleaning effect is close to the preset cleaning effect after cleaning the cleaning component. In this circumstance, the collected sewage is relatively clean, and the difference between the corresponding dirtiness measurement value and the dirtiness reference value is small. Therefore, a shorter cleaning time and/or a smaller water spraying amount is automatically set while setting the next round of cleaning strategies, in order to mildly clean the cleaning robot.

In another case, if the cleaning robot is cleaned for the first time, the dirtiness measurement value of the sewage after the first cleaning is generally higher than the dirtiness measurement value of the sewage after the $N^{th}$ cleaning, that is, with increase in the number of cleanings, the cleaning time and/or the water spraying amount set by the cleaning strategy gradually decreases until the base station exits the cleaning control when the cleaning robot meets the cleaning conditions.

Further, the specific setting method of the cleaning strategy may refer to the following method.

(1) If the dirtiness measurement value is greater than a preset maximum dirtiness reference value, the base station sets the next round of cleaning time as the preset longest cleaning time, and/or sets the next round of water spraying amount as the preset maximum water spraying amount.

(2) If the dirtiness measurement value is less than a preset minimum dirtiness reference value, the base station sets the next round of cleaning time as the preset shortest cleaning time, and/or sets the next round of water spraying amount as the preset minimum water spraying amount.

(3) If the dirtiness measurement value is less than the maximum dirtiness reference value and greater than the minimum dirtiness reference value, the base station calculates the next round of cleaning time by a preset first formula, and/or calculates the next round of water spraying amount by a preset second formula.

In this embodiment, the dirtiness reference value may include the maximum dirtiness reference value (represented by X1) and the minimum dirtiness reference value (represented by X2). The dirtiness of the sewage is divided into three levels as follows. The cleaning robots with a dirtiness measurement value above X1 are classified into a first level, which indicates the highest dirtiness. The cleaning robots with a dirtiness measurement value between (X1, X2) are classified into a second level, which indicates a medium dirtiness. The cleaning robots with a dirtiness measurement value below X2 are classified into a third level, which indicates a lowest dirtiness.

In this embodiment, for the cleaning robots at the first level, the longest cleaning time and the maximum water spraying amount are set as the cleaning strategy due to the highest dirtiness, to perform the next round of cleaning on the cleaning robots. For the cleaning robots at the second level, the cleaning time and the water spraying amount in the next round may be flexibly adjusted through the preset first formula and the second formulas, since the cleaning robot is at a medium dirtiness between the highest dirtiness and lowest dirtiness. For the cleaning robot at the third level, the shortest cleaning time and the minimum water spraying amount are set as the cleaning strategy due to the lowest dirtiness. The first formula and the second formula may be obtained based on the developer's experimental experience, which is not limited to this method and is not specifically limited herein.

In this embodiment, if the dirtiness measurement value is represented by the absorbance mean value of the sewage, the dirtiness reference value is correspondingly represented by the maximum absorbance reference value and the minimum absorbance reference value.

Specifically, the first formula and the second formula may each be a one-variable linear formula. Optionally, examples of the first formula and the second formula are provided as follows.

The first formula is showed as:

$$T_x = \frac{(T_{max} - T_{min}) \times (\text{DIFF\_En} - X_0)}{(X_1 - X_0)} + T_{min}.$$

The second formula is showed as:

$$V_x = \frac{(V_{max} - V_{min}) \times (\text{DIFF\_En} - X_0)}{(X_1 - X_0)} + V_{min}.$$

$T_x$ is the cleaning time of the $x^{th}$ round of cleaning control. $T_{max}$ is the longest cleaning time, and $T_{min}$ is the shortest cleaning time. DIFF_En is the difference between the absorbance mean value and the absorbance reference mean value of the sewage. $X_0$ is the minimum absorbance reference value. $X_1$ is the maximum absorbance reference value. $V_x$ is the water spraying amount of the $x^{th}$ round of cleaning control. $V_{max}$ is the maximum water spraying amount, and $V_{min}$ is the minimum water spraying amount.

Further, the base station uploads the cleaning information of this time after completing the cleaning on the cleaning robot, and the cleaning information includes at least one of the cleaning time, the dirtiness, the water amount of the cleaning water tank and the water amount of the sewage tank.

In this embodiment, the base station uploads the current cleaning information to the server for storage through The Internet of Things (IOT). In addition, the cleaning information is sent to the user client for display, so that the user can supervise the cleaning conditions, including the water amount of the cleaning water tank, the water amount of the sewage tank, the cleaning time and the dirtiness, of the cleaning robot at any time.

In the embodiment of the present disclosure, it is described in detail how to automatically generate the next round of cleaning strategy for the cleaning robot according to the dirtiness of the sewage. Firstly, whether the cleaning robot has reached the preset cleaning effect (that is, whether the cleaning robot has been cleaned) is determined by the cleaning exit condition. For the cleaning robots that need to perform the next round of cleaning, the dirtiness of the cleaning robots that have not reached the preset cleaning effect is further measured by the dirtiness reference value, so as to select the preset cleaning strategy. Therefore, the cleaning strategy is flexibly set based on the dirtiness of the cleaning robot, which not only ensures that the cleaning robot achieves the preset cleaning effect, but also reduce the waste of cleaning water on the premise that the cleaning robot is clean.

When the base station cleans the cleaning robot each time, the base station firstly cleans the cleaning component of the cleaning robot according to the result of a previous round of cleaning or a cleaning strategy set for the first round of cleaning, and collects the sewage after the round of cleaning. Then, the dirtiness of the sewage is detected, so as to control the cleaning on the cleaning component of the cleaning robot, for example, the cleaning robot is continuously cleaned in the next round, or the next round of cleaning strategy is set according to the detected dirtiness of the sewage. Therefore, the next round of cleaning on the cleaning component of the cleaning robot is controlled according to the dirtiness detection result of the sewage, thereby improving the flexibility of the cleaning control on the cleaning robot, and achieving the cleaning effect on the cleaning robot after cleaning each time, while reducing the waste of the cleaning water at the same time.

Figure 9:
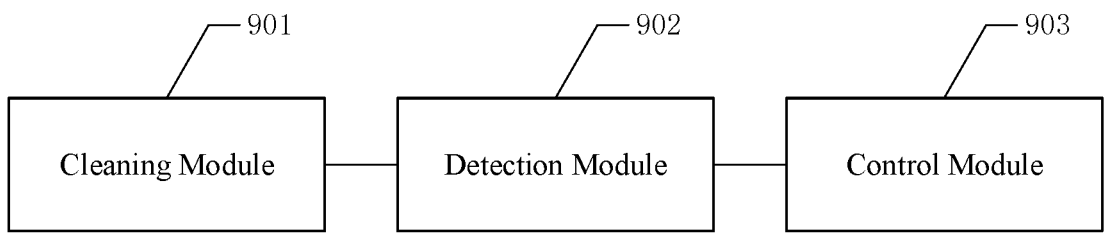
FIG. 9 is a block diagram of a cleaning control device for the cleaning robot according to an embodiment of the present disclosure.

Described above is the cleaning control method for the cleaning robot in the embodiment of the present disclosure. The cleaning control device for the cleaning robot in the embodiment of the present disclosure is described below. Referring to FIG. 9, the cleaning control device for the cleaning robot according to the embodiment of the present disclosure includes:

a cleaning module 901 configured to perform a round of cleaning on a cleaning component of the cleaning robot according to a set cleaning strategy;

a detection module 902 configured to detect a dirtiness of sewage after cleaning after completing the round of cleaning to obtain a detection result; and a control module 903 configured to perform a next round of cleaning control on the cleaning robot according to the detection result.

In the embodiment of the present disclosure, the base station firstly performs a round of cleaning on the cleaning component of the cleaning robot by the set cleaning strategy, and collects the sewage after cleaning. And then the base station detects the dirtiness of the sewage to characterize the dirtiness of the cleaning component. Finally, the base station controls the cleaning component of the cleaning robot to clean according to the dirtiness of the sewage, so as to determine the conditions of the cleaning control according to the dirtiness of the cleaning component, thereby improving the flexibility of the cleaning control of the cleaning robot.

Figure 10:
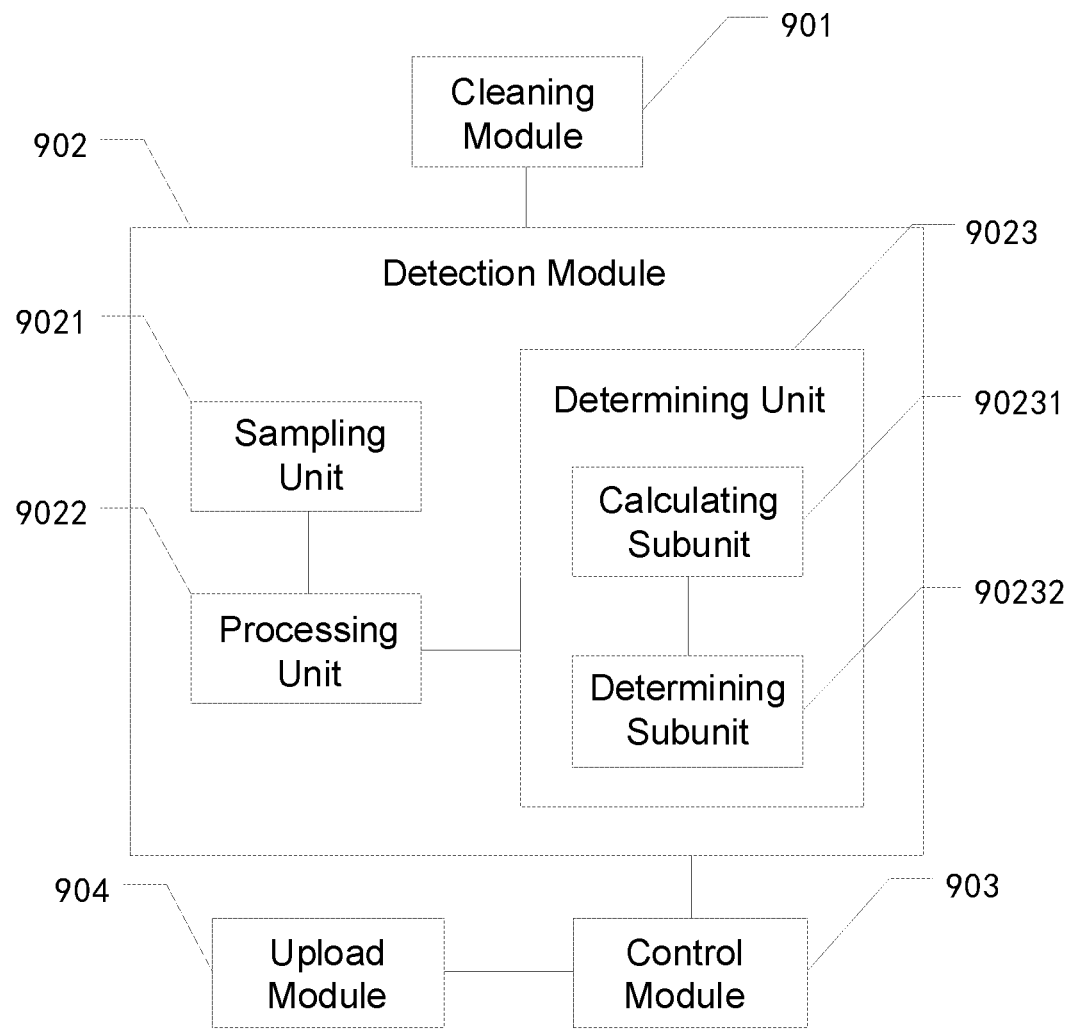
FIG. 10 is a block diagram of the cleaning control device for the cleaning robot according to another embodiment of the present disclosure.

Referring to FIG. 10, the cleaning control device for the cleaning robot according to another embodiment of the present disclosure includes:

a cleaning module 901 configured to perform a round of cleaning on a cleaning component of the cleaning robot according to a set cleaning strategy;

a detection module 902 configured to detect a dirtiness of sewage after cleaning after completing the round of cleaning to obtain a detection result; and a control module 903 configured to perform a next round of cleaning control on the cleaning robot according to the detection result.

Specifically, the control module 903 is further configured to determine whether the cleaning component of the cleaning robot meets a preset cleaning exit condition according to the detection result.

The cleaning control of the cleaning robot is exited, if the cleaning component of the cleaning robot meets the preset cleaning exit condition according to the detection result.

The next round of cleaning strategy is set, and the next round of cleaning is performed on the cleaning robot according to the set next round of cleaning strategy, if the cleaning component of the cleaning robot does not meet the preset cleaning exit condition according to the detection result.

Specifically, the sewage temporary storage tank of the base station is provided with a plurality of first optical components, which include a first emitting tube and a first receiving tube that are arranged opposite to each other. After completing each round of cleaning, the detection module 902 includes:

a sampling unit 9021 configured to control the first emitting tube to emit light after completing the round of cleaning, and perform at least two light samplings through the first receiving tube to obtain at least two first absorbance values of the sewage after the round of cleaning;

a processing unit 9022 configured to perform a data processing on the at least two first absorbance values to obtain a dirtiness measurement value of the sewage after the round of cleaning; and a determining unit 9023 configured to determine the dirtiness detection result of the sewage after cleaning according to the dirtiness measurement value and a preset dirtiness reference value.

Specifically, the cleaning water tank of the base station is provided with a plurality of second optical components, which include a second emitting tube and a second receiving tube that are arranged opposite to each other. The sampling unit 9021 is further configured to control the second emitting tube to emit light and perform a light sampling through the second receiving tube, to obtain a second absorbance value of the cleaning water in the cleaning water tank. The processing unit 9022 is further configured to perform a data processing on the second absorbance value, to obtain the dirtiness measurement value of the cleaning water in the cleaning water tank. The determining unit 9023 is further configured to set the dirtiness measurement value of the cleaning water in the cleaning water tank as the dirtiness reference value.

Specifically, the processing unit 9022 is further configured to determine the mean value and/or the variance of the at least two first absorbance values to obtain a dirtiness measurement value of the sewage after the round of cleaning. The dirtiness measurement value includes the absorbance mean value and/or the absorbance variance.

Specifically, the dirtiness reference value includes an absorbance reference mean value and an absorbance reference variance. The determining unit 9023 further includes:

a calculating subunit 90231 configured to calculate the difference between the absorbance mean value and the reference absorbance mean value, to obtain a difference, or compare the absorbance variance and the absorbance reference variance, to obtain the numerical comparison result; and/or a determining subunit 90232 configured to determine the dirtiness detection result of the sewage after the round of cleaning according to the mean value difference and/or the numerical comparison result.

Specifically, the control module 903 is further configured to set the next round of cleaning strategy according to the dirtiness measurement value and the dirtiness reference value. The cleaning strategy includes the cleaning time and/or the water spraying amount.

Specifically, the control module 903 is further configured to:

set the next round of cleaning time as the preset maximum cleaning time, and/or set the next round of water spraying amount as the preset maximum water spraying amount, if the dirtiness measurement value is greater than a preset maximum dirtiness reference value;

set the next round of cleaning time as the preset shortest cleaning time, and/or set the next round of water spraying amount as the preset minimum water spraying amount, if the dirtiness measurement value is less than a preset minimum dirtiness reference value; and calculate the next round of cleaning time by a preset first formula, and/or calculates the next round the water spraying amount by a preset second formula, if the dirtiness measurement value is less than the maximum dirtiness reference value and greater than the minimum dirtiness reference value.

Specifically, the cleaning control device for the cleaning robot further includes an uploading module 904 configured to upload the current cleaning information after completing the cleaning on the cleaning robot. The cleaning information includes at least one of the cleaning time, the dirtiness, the water amount in the cleaning water tank and the water amount in the sewage tank.

In the embodiment of the present disclosure, it is described in detail that the base station detects the dirtiness of the sewage, and flexibly generates the cleaning strategies according to the dirtiness of the sewage. The absorbance of the sewage is detected by the first optical components of the sewage tank, and the dirtiness of the cleaning robot is measured by combining the dirtiness reference value, to provide a reference for formulating the next round of cleaning strategy, thereby realizing the dirtiness detection of the cleaning robot. Then, it is determined whether the cleaning robot has been cleaned by the cleaning exit condition. For the cleaning robots that are not cleaned, the cleaning strategy is further formulated by combining the dirtiness reference value, to ensure that the cleaning component of the cleaning robot achieves the cleaning effect, and the waste of cleaning water is reduced at the same time, thereby flexibly controlling the cleaning on the cleaning robot.

FIGS. 9 and 10 illustrate the cleaning control device for the cleaning robot according to an embodiment of the present disclosure in detail from the perspective of modular functional entities, and the base station in the embodiment of the present disclosure is described in detail below from the perspective of hardware processing.

Figure 11:
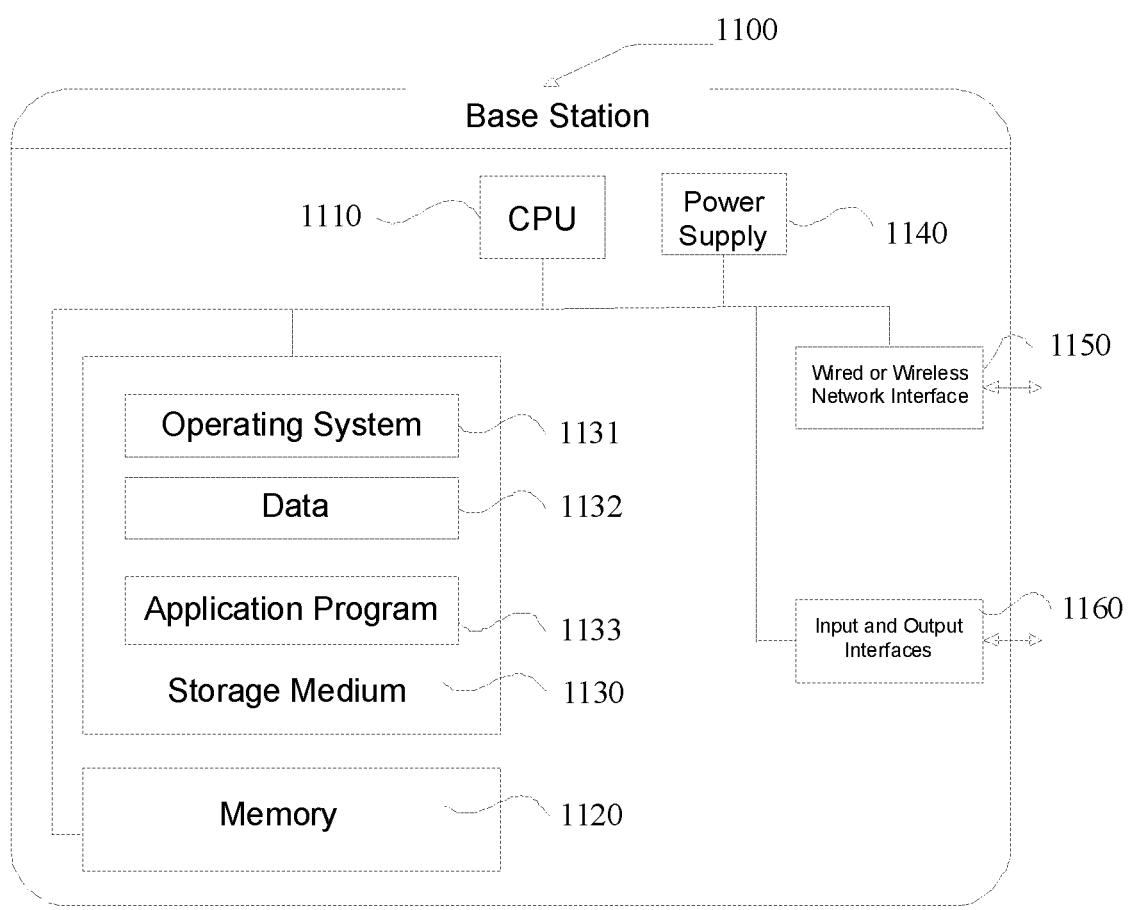
FIG. 11 is a block diagram of a hardware structure of the base station according to an embodiment of the present disclosure.

FIG. 11 is a block diagram of a hardware structure of the base station according to an embodiment of the present disclosure. The base station 1100 may have relatively large differences due to different configurations or performance, which may include one or more central processing units (CPU) 1110 (for example, one or more processors), a memory 1120, and one or more storage mediums 1130 (for example, one or more storage devices) that store application programs 1133 or data 1132. The memory 1120 and the storage medium 1130 may be used for short-term storage or permanent storage. The programs stored in the storage medium 1130 may include one or more modules (not shown in the figure), and each module may include a series of operation instructions on the base station 1100. Further, the central processing units 1110 may be configured to communicate with the storage medium 1130, and execute the series of operation instructions in the storage medium 1130 on the base station 1100.

The base station 1100 may further include one or more power supplies 1140, one or more wired or wireless network interfaces 1150, one or more input and output interfaces 1160, and/or one or more operating systems 1131, such as Windows Serve, Mac OS X, Unix, Linux and FreeBSD. It should be understood for those skilled in the art that the structure of the base station shown in FIG. 11 does not constitute a limitation on the base station, which may include more or less components than those shown in the figure, or combine some components, or arrange components in different ways.

The present disclosure further provides a base station including a memory and a processor, in which the memory stores computer-readable instructions. When the computer-readable instructions are executed by the processor, the processor executes steps of the cleaning control method for the cleaning robot in the foregoing embodiments.

The present disclosure further provides a computer-readable storage medium, which may be a non-volatile computer-readable storage medium, or may be a volatile computer-readable storage medium. The computer-readable storage medium stores instructions, and when the instructions are run on a computer, the computer executes the steps of the cleaning control method for the cleaning robot.

Those skilled in the art can clearly understand that, for the convenience and conciseness of description, the specific working process of the above-described system, device, and unit may refer to the corresponding process in the foregoing method embodiment, which will not be repeated herein.

If the integrated unit is implemented in the form of a software functional unit and sold or used as an independent product, it may be stored in a computer-readable storage medium. Based on this understanding, the technical solution of the present disclosure or the part that is distinguished from the traditional technology or all or part of the technical solution may be embodied in the form of a software product. The computer software product is stored in a storage medium, which includes several instructions configured to make a computer device (may be a personal computer, a server, or a network device) execute all or part of the steps of the method described in each embodiment of the present disclosure. The aforementioned storage medium may be a U-disk, a mobile hard disk, a read-only memory (ROM), a random access memory (RAM), a magnetic disk, an optical disk or other medium capable of storing program code.

The above-mentioned embodiments are only used to illustrate the technical solutions of the present disclosure, but not to limit the technical solutions. Although the present disclosure has been described in detail with reference to the foregoing embodiments, it should be understood for those of ordinary skill in the art that the technical solutions recorded in the embodiments may be further modified, or some of the technical features may be equivalently replaced. These modifications or replacements do not cause the essence of the corresponding technical solutions to deviate from the spirit and scope of the technical solutions of the embodiments of the present disclosure.

What is claimed is:

1. A cleaning method for a cleaning robot, executed by a base station, comprising:
    performing a round of cleaning on a cleaning component of the cleaning robot according to a set cleaning strategy;
    detecting a dirtiness of sewage after cleaning to obtain a detection result, after completing the round of cleaning; and performing a next round of cleaning control on the cleaning robot according to the detection result
    wherein a plurality of first optical components are arranged in a sewage temporary storage tank of the base station, and a set of the first optical components comprise a first emitting tube and a first receiving tube that are arranged opposite to each other, and
    wherein detecting the dirtiness of the sewage to obtain the detection result after cleaning after completing the round of cleaning comprises:
    controlling the first emitting tube to emit light, and performing at least two light samplings through the first receiving tube to obtain at least two first absorbance values of the sewage after the round of cleaning, after completing the round of cleaning;
    performing a data processing on the at least two first absorbance values to obtain a dirtiness measurement value of the sewage after the round of cleaning, wherein the dirtiness measurement value comprises an absorbance mean value; and
    determining the detection result of the sewage according to the dirtiness measurement value and a preset dirtiness reference value;
    wherein the performing the next round of cleaning control on the cleaning robot according to the detection result comprises:
    setting the next round of cleaning strategy according to the dirtiness measurement value and the preset dirtiness reference value, and performing the next round of cleaning strategy on the cleaning robot for cleaning according to the detection result of the sewage;
    wherein setting the next round of cleaning strategy according to the dirtiness measurement value and a preset dirtiness reference value, comprises:
    setting a cleaning time of the next round as a preset longest cleaning time, and setting a water spraying amount of the next round as a preset maximum cleaning time, in response to that the dirtiness measurement value is greater than a preset maximum dirtiness reference value;
    setting the cleaning time of the next round as a preset shortest cleaning time, and setting the water spraying amount of the next round as a preset minimum water spraying amount, in response to that the dirtiness measurement value is less than a preset minimum dirtiness reference value; and
    calculating the cleaning time of the next round by a preset first formula, and calculating the water spraying amount of the next round by a preset second formula, in response to that the dirtiness measurement value is less than the maximum dirtiness reference value and greater than the minimum dirtiness reference value.

2. The cleaning method for the cleaning robot of claim 1, wherein a plurality of second optical components are arranged in a cleaning water tank of the base station, and a set of the second optical components comprise a second emitting tube and a second receiving tube that are arranged opposite to each other, and wherein the cleaning control method for the cleaning robot further comprises:
  controlling, the second emitting tube to emit light and performing a light sampling through the second receiving tube, to obtain a second absorbance value of a cleaning water in the cleaning water tank;
  performing, a data processing on the second absorbance value to obtain a dirtiness measurement value of the cleaning water in the cleaning water tank; and
  setting, the dirtiness measurement value of the cleaning water in the cleaning water tank as the preset dirtiness reference value.

3. The cleaning method for the cleaning robot of claim 2, wherein performing, the data processing on the at least two first absorbance values to obtain the dirtiness measurement value of the sewage after the round of cleaning comprises:
  determining, a mean value and a variance of the at least two first absorbance values, to obtain the dirtiness measurement value of the sewage after the round of cleaning, and wherein the dirtiness measurement value further comprises an absorbance variance.

4. The cleaning method for the cleaning robot of claim 3, wherein the dirtiness reference value comprises an absorbance reference mean value and an absorbance reference variance, and wherein determining the dirtiness detection result of the sewage after cleaning according to the dirtiness measurement value and the preset dirtiness reference value comprises:
  performing, a difference calculation between the absorbance mean value and the absorbance reference mean value to obtain a mean value difference,
  and performing, a numerical comparison between the absorbance variance and the absorbance reference variance to obtain a numerical comparison result, and
  determining, the dirtiness detection result of the sewage after the round of cleaning according to the mean value difference and/or the numerical comparison result.

5. The cleaning method for the cleaning robot of claim 1, further comprising:
  uploading, by the base station, a current cleaning information after completing a cleaning for the cleaning robot, wherein the current cleaning information comprises at least one of cleaning time, dirtiness, a water volume of a cleaning water tank, and a water volume of a sewage tank.

6. The cleaning method for the cleaning robot of claim 1, wherein
the first formula is showed as:

$$T_x = \frac{(T_{max} - T_{min}) \times (DIFF\_En - X_0)}{(X_1 - X_0)} + T_{min};$$

the second formula is showed as:

$$V_x = \frac{(V_{max} - V_{min}) \times (DIFF\_En - X_0)}{(X_1 - X_0)} + V_{min};$$

$T_x$ is the cleaning time of a xth round of cleaning control; $T_{max}$ is a longest cleaning time, and $T_{min}$ is the shortest cleaning time; DIFF_En is a difference between the absorbance mean value and the absorbance reference mean value of the sewage; $X_0$ is a minimum absorbance reference value; $X_1$ is a maximum absorbance reference value; $V_x$ is the water spraying amount of the xth round of cleaning control; $V_{max}$ is a maximum water spraying amount, and $V_{min}$ is a minimum water spraying amount.

7. A base station, applied to a cleaning robot, comprising a memory and at least one processor, wherein instructions are stored in the memory, and
  wherein the at least one processor calls the instructions in the memory, so that the base station executes a cleaning method for the cleaning robot, comprising:
  performing, a round of cleaning on a cleaning component of the cleaning robot according to a set cleaning strategy;
  detecting, a dirtiness of sewage after cleaning to obtain a detection result, after completing the round of cleaning; and performing a next round of cleaning control on the cleaning robot according to the detection result
  wherein a plurality of first optical components are arranged in a sewage temporary storage tank of the base station, and a set of the first optical components comprise a first emitting tube and a first receiving tube that are arranged opposite to each other, and
  wherein detecting the dirtiness of the sewage to obtain the detection result after cleaning after completing the round of cleaning comprises:
  controlling the first emitting tube to emit light, and performing at least two light samplings through the first receiving tube to obtain at least two first absorbance values of the sewage after the round of cleaning, after completing the round of cleaning;
  performing a data processing on the at least two first absorbance values to obtain a dirtiness measurement value of the sewage after the round of cleaning, wherein the dirtiness measurement value comprises an absorbance mean value; and
  determining the detection result of the sewage according to the dirtiness measurement value and a preset dirtiness reference value;
  wherein the performing the next round of cleaning control on the cleaning robot according to the detection result comprises:
  setting the next round of cleaning strategy according to the dirtiness measurement value and the preset dirtiness reference value, and performing the next round of cleaning strategy on the cleaning robot for cleaning according to the detection result of the sewage;
  wherein setting the next round of cleaning strategy according to the dirtiness measurement value and a preset dirtiness reference value, comprises:
  setting a cleaning time of the next round as a preset longest cleaning time, and setting a water spraying amount of the next round as a preset maximum cleaning time, in response to that the dirtiness measurement value is greater than a preset maximum dirtiness reference value;
  setting the cleaning time of the next round as a preset shortest cleaning time, and setting the water spraying amount of the next round as a preset minimum water spraying amount, in response to that the dirtiness measurement value is less than a preset minimum dirtiness reference value; and calculating the cleaning time of the next round by a preset first formula, and calculating the water spraying amount of the next round by a preset second formula, in response to that the dirtiness measurement value is less than the maximum dirtiness reference value and greater than the minimum dirtiness reference value.

8. The base station of claim 7, wherein a plurality of second optical components are arranged in a cleaning water tank of the base station, and a set of the second optical components comprise a second emitting tube and a second receiving tube that are arranged opposite to each other, and wherein the cleaning control method for the cleaning robot further comprises:
controlling, the second emitting tube to emit light and performing a light sampling through the second receiving tube, to obtain a second absorbance value of a cleaning water in the cleaning water tank;
performing, a data processing on the second absorbance value to obtain a dirtiness measurement value of the cleaning water in the cleaning water tank; and
setting, the dirtiness measurement value of the cleaning water in the cleaning water tank as the preset dirtiness reference value.

9. The base station of claim 8, wherein performing, the data processing on the at least two first absorbance values to obtain the dirtiness measurement value of the sewage after the round of cleaning comprises:
determining, a mean value and a variance of the at least two first absorbance values, to obtain the dirtiness measurement value of the sewage after the round of cleaning, and wherein the dirtiness measurement value further comprises an absorbance variance.

10. The base station of claim 9, wherein the dirtiness reference value comprises an absorbance reference mean value and an absorbance reference variance, and wherein determining, the dirtiness detection result of the sewage after cleaning according to the dirtiness measurement value and the preset dirtiness reference value comprises:
performing, a difference calculation between the absorbance mean value and the absorbance reference mean value to obtain a mean value difference,
and performing, a numerical comparison between the absorbance variance and the absorbance reference variance to obtain a numerical comparison result, and
determining, by the base station, the dirtiness detection result of the sewage after the round of cleaning according to the mean value difference and/or the numerical comparison result.

11. The base station of claim 7, further comprising:
uploading, a current cleaning information after completing a cleaning for the cleaning robot, wherein the current cleaning information comprises at least one of cleaning time, dirtiness, a water volume of a cleaning water tank, and a water volume of a sewage tank.

12. The base station of claim 7, wherein
the first formula is showed as:

$$T_x = \frac{(T_{max} - T_{min}) \times (DIFF\_En - X_0)}{(X_1 - X_0)} + T_{min};$$

the second formula is showed as:

$$V_x = \frac{(V_{max} - V_{min}) \times (DIFF\_En - X_0)}{(X_1 - X_0)} + V_{min};$$

$T_x$ is the cleaning time of a xth round of cleaning control; $T_{max}$ is a longest cleaning time, and $T_{min}$ is the shortest cleaning time; DIFF_En is a difference between the absorbance mean value and the absorbance reference mean value of the sewage; $X_0$ is a minimum absorbance reference value; $X_1$ is a maximum absorbance reference value; $V_x$ is the water spraying amount of the xth round of cleaning control; $V_{max}$ is a maximum water spraying amount, and $V_{min}$ is a minimum water spraying amount.

13. A non-transitory computer-readable storage medium, storing instructions, wherein when the instructions are run on a computer, the computer executes a cleaning method for a cleaning robot, executed by a base station, comprising:
performing, a round of cleaning on a cleaning component of the cleaning robot according to a set cleaning strategy;
detecting, a dirtiness of sewage after cleaning to obtain a detection result, after completing the round of cleaning; and performing a next round of cleaning control on the cleaning robot according to the detection result
wherein a plurality of first optical components are arranged in a sewage temporary storage tank of the base station, and a set of the first optical components comprise a first emitting tube and a first receiving tube that are arranged opposite to each other, and
wherein detecting the dirtiness of the sewage to obtain the detection result after cleaning after completing the round of cleaning comprises:
controlling the first emitting tube to emit light, and performing at least two light samplings through the first receiving tube to obtain at least two first absorbance values of the sewage after the round of cleaning, after completing the round of cleaning;
performing a data processing on the at least two first absorbance values to obtain a dirtiness measurement value of the sewage after the round of cleaning, wherein the dirtiness measurement value comprises an absorbance mean value; and
determining the detection result of the sewage according to the dirtiness measurement value and a preset dirtiness reference value;
wherein the performing the next round of cleaning control on the cleaning robot according to the detection result comprises:
setting the next round of cleaning strategy according to the dirtiness measurement value and the preset dirtiness reference value, and performing the next round of cleaning strategy on the cleaning robot for cleaning according to the detection result of the sewage;
wherein setting the next round of cleaning strategy according to the dirtiness measurement value and a preset dirtiness reference value, comprises:
setting a cleaning time of the next round as a preset longest cleaning time, and setting a water spraying amount of the next round as a preset maximum cleaning time, in response to that the dirtiness measurement value is greater than a preset maximum dirtiness reference value;
setting the cleaning time of the next round as a preset shortest cleaning time, and setting the water spraying amount of the next round as a preset minimum water spraying amount, in response to that the dirtiness measurement value is less than a preset minimum dirtiness reference value; and
calculating the cleaning time of the next round by a preset first formula, and calculating the water spraying amount of the next round by a preset second formula, in response to that the dirtiness measurement value is less than the maximum dirtiness reference value and greater than the minimum dirtiness reference value.

14. The non-transitory computer-readable storage medium of claim 13, wherein
the first formula is showed as:

$$T_x = \frac{(T_{max} - T_{min}) \times (DIFF\_En - X_0)}{(X_1 - X_0)} + T_{min};$$

the second formula is showed as:

$$V_x = \frac{(V_{max} - V_{min}) \times (DIFF\_En - X_0)}{(X_1 - X_0)} + V_{min};$$

$T_x$ is the cleaning time of a xth round of cleaning control; $T_{max}$ is a longest cleaning time, and $T_{min}$ is the shortest cleaning time; DIFF_En is a difference between the absorbance mean value and the absorbance reference mean value of the sewage; $X_0$ is a minimum absorbance reference value; $X_1$ is a maximum absorbance reference value; $V_x$ is the water spraying amount of the xth round of cleaning control; $V_{max}$ is a maximum water spraying amount, and $V_{min}$ is a minimum water spraying amount.

* * * * *